United States Patent
Chen et al.

(10) Patent No.: US 7,051,115 B2
(45) Date of Patent: May 23, 2006

(54) METHOD AND APPARATUS FOR PROVIDING A SINGLE SYSTEM IMAGE IN A CLUSTERED ENVIRONMENT

(75) Inventors: Ying Chen, San Jose, CA (US); Benjamin Clay Reed, San Jose, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 817 days.

(21) Appl. No.: 09/839,794

(22) Filed: Apr. 19, 2001

(65) Prior Publication Data

US 2002/0165964 A1    Nov. 7, 2002

(51) Int. Cl.
*G06F 15/16*    (2006.01)

(52) U.S. Cl. .............. 709/245; 709/220; 709/223; 709/242

(58) Field of Classification Search ............ 709/202, 709/205, 223, 224, 226, 229, 238
See application file for complete search history.

(56) References Cited

U.S. PATENT DOCUMENTS

| | | | | |
|---|---|---|---|---|
| 6,006,259 A * | 12/1999 | Adelman et al. | .......... | 709/223 |
| 6,175,874 B1 * | 1/2001 | Imai et al. | .......... | 709/238 |
| 6,195,680 B1 * | 2/2001 | Goldszmidt et al. | .......... | 709/203 |
| 6,243,763 B1 | 6/2001 | Brodsky et al. | .......... | 719/316 |
| 6,389,448 B1 * | 5/2002 | Primak et al. | .......... | 718/105 |
| 6,397,260 B1 * | 5/2002 | Wils et al. | .......... | 709/238 |
| 6,535,510 B1 * | 3/2003 | Kalkunte et al. | .......... | 370/389 |
| 6,560,630 B1 * | 5/2003 | Vepa et al. | .......... | 718/105 |
| 6,590,861 B1 * | 7/2003 | Vepa et al. | .......... | 370/216 |
| 6,625,152 B1 * | 9/2003 | Monsen et al. | .......... | 370/392 |
| 6,725,264 B1 * | 4/2004 | Christy | .......... | 709/225 |
| 6,772,226 B1 * | 8/2004 | Bommareddy et al. | .......... | 709/245 |
| 6,779,017 B1 * | 8/2004 | Lamberton et al. | .......... | 709/203 |
| 6,779,039 B1 * | 8/2004 | Bommareddy et al. | .......... | 709/238 |
| 6,801,949 B1 * | 10/2004 | Bruck et al. | .......... | 709/232 |
| 6,839,752 B1 * | 1/2005 | Miller et al. | .......... | 709/224 |
| 6,895,433 B1 * | 5/2005 | Slater et al. | .......... | 709/220 |
| 6,901,445 B1 * | 5/2005 | McCanne et al. | .......... | 709/225 |
| 6,938,031 B1 * | 8/2005 | Zoltan et al. | .......... | 707/1 |
| 6,944,786 B1 * | 9/2005 | Kashyap | .......... | 714/4 |
| 6,947,384 B1 * | 9/2005 | Bare | .......... | 370/235 |
| 6,948,003 B1 * | 9/2005 | Newman et al. | .......... | 709/250 |
| 6,976,258 B1 * | 12/2005 | Goyal et al. | .......... | 718/104 |

OTHER PUBLICATIONS

Cisco local director 400 Series. In http://www.cisco.com/warp/public/cc/pd/cxsr/400/index.shtml, 2 pgs., 2001.

(Continued)

*Primary Examiner*—Ario Etienne
*Assistant Examiner*—Sargon Nano
(74) *Attorney, Agent, or Firm*—Gates & Cooper LLP

(57) ABSTRACT

A method of providing a single system image in a clustered environment. An internet protocol (IP) address is assigned as a cluster IP address. The cluster IP address is bound to a node in a cluster. A client request directed to the cluster IP address is received in the node. The node multicasts the request to all nodes in the cluster. A dynamically adjustable workload distribution function filters the request, wherein the function is configured to allow a single node to process the client request. A response to the request is obtained. A cluster media access control (MAC) address is inserted into the response and the response is sent from the single node to the client.

39 Claims, 2 Drawing Sheets

OTHER PUBLICATIONS

T. Brisco. DNS support for load balancing. In http://andrew2.andrew.cmu.edu/rfc/rfc1794.html, Network Working Group, RFC 1794, Apr., 1995, 6 pgs.

O. Damani, P. Chung, and Y. Huang ONE-IP: Techniques for hosting a service on a cluster of machines. In Proceeding of 6th International World Wide Web Conference, 1997.

D. Dias, W. Kish, R. Mukherjee, and R. Tewari. A scalable and highly available server. In COMPCON, 1996.

E. Anderson, D. Patterson, and E. Brewer. The magicrouter, an application of fast packet interposing. In http://www.cs.berkeley.edu/~eanders/magicrouter/osdi96-mr-submission.ps, May 17, 1996.

K. Egevang, Cray Communications, and P. Francis. The IP Network Address Translator (NAT). In http://www.andrew2.andrew.cmu:edu/rfc/rfc1631.html, Network Working Group, May, 1994, 9 pgs.

T. Kwan, R. MaGrath, and D. Reed. NCSA's World Wide Web server: Design and performance, 1995.

C. Yoshikawa, B. Chun, P. Eastharn, A. Vahdat, T. Anderson, and D. Culler. Using smart clients to build scalable services. In Proceedings of Usenix, 1997.

T. Maufer, C. Semeria. Introduction to IP Multicast Routing. In http://www.kohala.com/start/papers.others/draft-ietf-mboned-intro-multicast-03.txt. Network Working Group, Jul., 1997, 58 pgs.

M. Snyder. Beyond Technology. Clustering. In http://www.as400.ibm.com/beyondtech/clustering.htm, 2000, 12 pgs.

Whitepapers: Introduction. Gigabit Ethernet Overview. In http://www.gigabit-ethernet.org/technology/whitepapers/gige_0698/intro.html, May, 1999, 30 pgs.

Cisco Press. Internetworking Basics. In http://www.ieng.com/cpress/cc/td/cpress/fund/ith/ith01gb.htm, 21 pgs., 1998.

Linux Network Address Translation. In http://www.linas.org/linux/load.html, Nov., 1998, 7 pgs.

Parallel I/O Archive at Dartmouth, What's new? In http://www.cs.dartmouth.edu/pario/, 2000, 3 pgs.

* cited by examiner

METHOD AND APPARATUS FOR PROVIDING A SINGLE SYSTEM IMAGE IN A CLUSTERED ENVIRONMENT

BACKGROUND OF THE INVENTION

1. Field of the Invention

The present invention relates to file server systems, and in particular, to a method and apparatus for providing a multicast based scheme to provide a single system image in a cluster-based network-attached file server.

2. Description of the Related Art

The ability to manage massive amounts of information in large scale databases has become of increasing importance in recent years. Increasingly, data analysts are faced with ever larger data sets, some of which measure in gigabytes or even terabytes. Further, the increase of web traffic to many popular web sites has lead to the design of cluster-based web servers to manage the data and traffic.

In a cluster-based server environment, two or more servers that work together are clustered. Clustering provides a way to improve throughput performance through proper load balancing techniques. Clustering generally refers to multiple computer systems or nodes (that comprise a central processing unit (CPU), memory, and adapter) that are linked together in order to handle variable workloads or to provide continued operation in the event one computer system or node fails. Each node in a cluster may be a multiprocessor system itself. For example, a cluster of four nodes, each with four CPUs, would provide a total of 16 CPUs processing simultaneously.

In a clustered environment, the data and management tasks may be distributed across multiple nodes or servers that may communicate with each other. Each node maintains a data storage device, processor, etc. to manage and access a portion of the data that may or may not be shared.

Further, to address high demands on data sharing and management, some systems utilize network-attached file servers (NAFS). NAFSes allow easy file sharing through standard protocols, such as NFS (network file system) and CIFS (common internet file system). The consolidation of a large amount of data in a file server simplifies management tasks. Furthermore, NAFSes are often designed with a single purpose, i.e., file serving. Accordingly, NAFSes can potentially provide a high level of performance, reliability, and availability. However, most of today's commercial NAFS systems are built from individual workstations. Limited hardware resources present an impediment to system scalability.

NAFSes may be combined in a cluster to provide a cluster-based NAFS system. A cluster-based NAFS requires a cluster-based file system (or parallel file system). Such a file system provides single naming space to allow file accesses using a global naming structure, such as an AFS (a distributed file system)-like directory structure. Additionally, to attain high performance, a parallel file system makes efficient use of parallelism within a cluster. The prior art may attempt to provide such an NAFS system. For example, in an NAFS environment, two-node cluster file servers for fall-over purposes may be provided. However, such a 2-node cluster system does not provide a single system image.

Several existing single system image (SSI solutions are used in a cluster-based web server environment. For example, the use of a network address translation (NAT) provides one potential solution. The growing number of internet hosts may eventually cause the shortage of unique IP addresses. NAT is an Internet technology designed to solve this problem. NAT allows multiple hosts connected on a private network to share the same IP address.

A range of possible SSI solutions are implemented and performed on the client-side of a transaction in a web environment. A direct way to achieve scalability and SSI is to instrument client side software to perform load balancing among cluster nodes. For instance, a client browser may be permitted to choose appropriate server nodes in the cluster without the client's knowledge. However, few companies provide such an option. Alternatively, an applet-based client side approach may be used to provide scalable accesses to servers. Under an applet-based approach, an applet runs on a client computer, collects load information, and carries out web accesses based on the gathered statistics. Such client-side approaches may provide high performance, but are not client-transparent.

Another range of possible SSI solutions are implemented and performed on the server-side of a web-server transaction. For example, one server-side SSI solution may use a round-robin DNS (domain name system) approach. Under a DNS approach, a DNS on the server side dynamically maps a cluster host name to different internet protocol (IP) addresses of the cluster nodes. The drawback of a DNS-based approach is that the name-IP translation may be cached in several name servers, and workload distribution changes can only be done rather statically.

In another server-side web-server approach, a TCP (transmission control protocol) router may be used. Using a TCP router, one of the cluster nodes serves as the router and dispatcher of the network packets. Clients only see the router IP address. The client requests always arrive at the router first. The router dispatches the request to other cluster nodes based on the observed workloads on each cluster node. When a cluster node replies to a client request, the node rewrites the network packet header with router's address and sends the request directly to the client without going through the router any more. However, the use of the router may cause a bottleneck in the processing of client requests.

In another possible server-side SSI solution (referred to as a routing-based dispatching scheme), a centralized dispatcher distributes workload to the cluster nodes. However, similar to the TCP router approach, the dispatcher can become the potential performance bottleneck. In another server-side SSI solution (referred to as a broadcast-based dispatching scheme), the routers between clients and the cluster nodes are configured to route client packets to the cluster nodes as Ethernet broadcast packets. A special device driver is installed on each cluster node to filter the client packets. The IP-level routing may increase router workload. Additionally, manual configuration of routers is required.

The above approaches provide SSI in a web server environment. However, such solutions have not been proposed or used in an NAFS environment. There are significant differences between a web server environment and an NAFS environment: First, the cluster nodes in a web server can be very loosely-coupled, or even independent of each other, while the cluster nodes in a file server must be tightly-coupled. This is because the web servers' workloads are mostly read-only. Accordingly, individual web server nodes can cache web pages aggressively and satisfy http requests without worrying about cache-coherency problems.

A parallel file system, however, may need to exchange information fairly frequently among the nodes to ensure file cache-coherency. Further, parallel file systems require high-performance interconnects to connect cluster nodes. Such an interconnection requirement does not exist for cluster-based web servers.

Secondly, a cluster-based file server is expected to deliver much higher bandwidth than a cluster-based web server. For instance, Cisco's local Director claims to deliver 24 MB/s throughput and handle 1,000,000 TCP connections at one time while a 2-node Network Appliances' filer can deliver around 60 MB/s throughput when tested with industry standard Netbench tests.

SSI solutions for a file server must consider such requirements. Accordingly, what is needed is a cluster-based network attached file server system that provides a parallel file system that may exchange information frequently and that may deliver information at a higher bandwidth than a cluster-based web server and presents an SSI to a client.

SUMMARY OF THE INVENTION

To address the requirements described above, the present invention discloses a method, apparatus, article of manufacture, and a memory structure that provides a single system image in a cluster based network attached file server environment. The invention provides a solution that is client-transparent, maximizes cluster performance, and provides high availability and high reliability.

One or more embodiments of the invention combine a multicasting scheme and a packet filtering mechanism. In the scheme, all client requests are multicast to all of the cluster nodes. The multicasting scheme allows all of the cluster nodes to view all of the client requests. A filtering mechanism is used on each cluster node to select appropriate network packets to process. A dynamically adjustable workload distribution function is embedded in the filter to balance the workload across cluster nodes. Thus, cluster nodes balance the workload by filtering the packets based on a request distribution function. The actual implementation may only require modification in the Ethernet device driver on each cluster node. Such an approach is scalable and can be easily extended to provide high availability and reliability.

Accordingly, one or more embodiments of the invention provide a cluster-based network attached file server system for a parallel file system that may exchange information frequently and that may deliver information at a higher bandwidth than a cluster-based web server. Further, besides a parallel file system, one or more embodiments may provide a cluster-based NAFS that provides a single system image (SSI). That is, user applications may be able to communicate with the cluster nodes as if they were talking to a single machine (single IP (internet protocol) or single host name). Such a SSI system provides a system that is easy to use. SSI does not require user application modifications or manual workload distribution to gain performance, availability, and reliability benefits of a cluster. Further, SSI provides a NAFS with the freedom to choose load-balancing optimization schemes.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
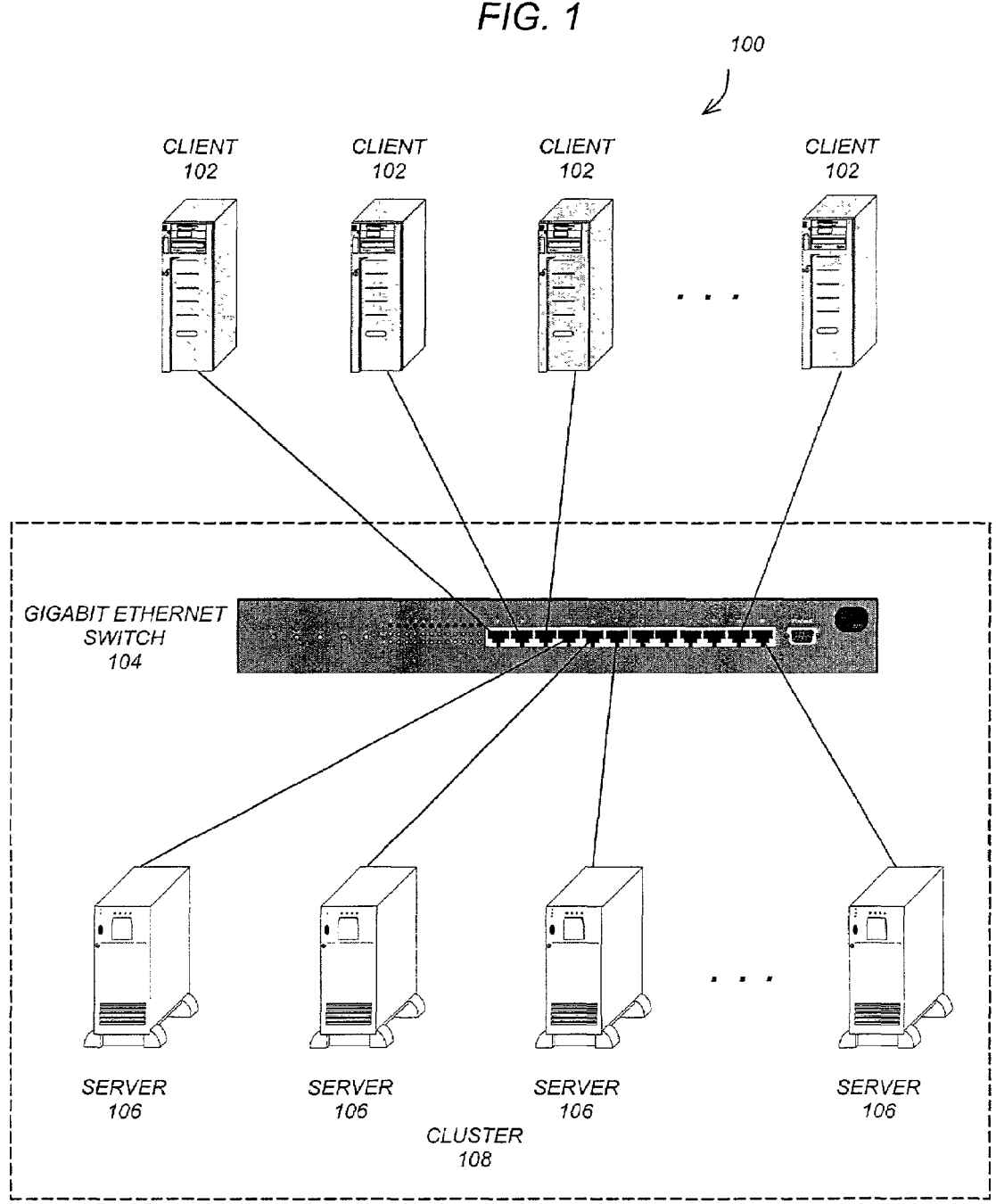
FIG. 1 is a block diagram showing a hardware environment in accordance with one or more embodiments of the invention.

FIG. 1 is a block diagram showing a hardware environment in accordance with one or more embodiments of the invention. A client-server cluster-based NAFS system 100 comprises multiple components and may utilize switching technology. The components include one or more clients 102 (also referred to as hosts or users) or client subnets. The clients 102 or client subnets are connected to one or mote clustered file servers 106 in a cluster 108 through a switch 104 or ports (e.g., a set of gigabit ethernet ports or a gigabit ethernet switch) exported from the cluster 108. A variety of types of switches or connections may be utilized. The clients 102 view the cluster 108 of file servers 106 as a single system image. Additionally, the clients 102 may run user applications.

Each file server 106 is a processing and management unit in a large file server cluster 108. Typically, a node (e.g., client 102 or server 106) may comprise a processor, memory, and an interface that enables communication through switch 104 with other nodes 102 and 106.

In one or more embodiments, the clients 102 and file servers 106 each include one or more processors that execute the logic necessary to accomplish the present invention. This logic may be stored in memory, loaded from a fixed or removable data storage device, or accessible from some other device across a network, through switch 104, or some other communications medium.

Multicast Approach

Under the multicast-based approach, the cluster 108 publicizes the IP address of one of the cluster nodes 106 as the "cluster IP address". When clients 102 send requests to the cluster 108, the client 102 requests are multicast to all of the cluster nodes 106. Various approaches may be utilized to multicast client 102 requests to cluster nodes 106. After multicasting, each cluster node 108 filters the client 102 requests based on a dynamically adjustable workload distribution function.

The distribution function may provide that for each packet received by the cluster 108, only one of the cluster nodes 106 receives the packet and replies to the sending client 102. All other nodes 106 drop the packet. In essence, the distribution function distributes the workload among the cluster nodes 106. When a cluster node 106 replies to a client 102, since the packet already has the cluster 108 IP in the header, a special device driver installed on the cluster node 106 just needs to insert the cluster 108 media access control (MAC) address and replies to the client 102.

Cluster IP Assignment

In order to present an SSI to clients 102, a system administrator assigns an IP address to the cluster 108. When the IP address is assigned, the cluster 108 binds the IP address with one of the network interfaces/interface cards (NICs) of a server node 106 in the cluster 108. The selection of which network interface and which cluster node 106 to bind is unimportant. The cluster 108 can choose to bind the IP address with any of the interfaces or nodes 106 in the cluster 108.

Once the cluster 108 IP address is bound to a NIC in one cluster node 106, that cluster node 106 (referred to as the "master IP node") informs other cluster nodes 106 of the cluster 108 IP address and the Ethernet address (MAC address) associated with the cluster 108 IP. Each node 106 can be installed with two NICs, one to handle client-server traffic, and the other one to handle cluster node 106 internal traffic.

Mulitcasting Methods

The multicast-based SSI scheme requires some mechanism to broadcast client 102 requests to all cluster nodes 106. Various approaches may be utilized to provide such broadcasting capabilities. Examples of two such multicasting approaches are discussed below.

Virtual Local Area Network (VLAN) Approach

One example of a multicasting approach combines virtual local area network (VLAN) switching technology with the cluster 108. VLAN is a switching technology designed to support multicasting/broadcasting of Ethernet packets to nodes 106 connected by a gigabit Ethernet switch 104. Packets designated to a node 106 in a VLAN will be broadcast to all other nodes 106 on that VLAN.

VLAN provides a natural way to achieve the multicasting effect of the SSI scheme of the invention. To ensure that the client 102 requests arriving at the cluster switch 104 can be broadcast to all of the cluster nodes 106, a VLAN is formed comprising all of the cluster nodes 106. This VLAN contains the master NIC, i.e., the NIC used to bind the cluster IP, and one NIC from each of the non-master IP nodes 106. Since client 102 request refers to the master IP address, unless the master NIC belongs to the VLAN, the client 102 packets are not broadcast to all of the nodes 106.

VLAN is a switching technology. Accordingly, packet forwarding and processing can be fast when compared to an IP-level router-based broadcasting. Furthermore, since VLAN configuration can be done before the cluster NAFS 106 is shipped, customer configuration may not be required.

With a gigabit switch 104, multiple cluster nodes 106 can potentially send requests to clients 102 simultaneously (depending on the switch internal packet forwarding algorithms and switch topology). Such simultaneous capability provides advantages with a read-dominant workload, since the outgoing traffic from file servers 106 to clients 102 is much larger than the incoming traffic. Such performance advantage may not be possible with a router-based approach.

Almost all of the network cards in servers 106 can also be set to a promiscuous mode wherein all network packets are accepted. However, setting the card mode to promiscuous mode may introduce a performance penalty, since the host 102 may have to process all of the packets sent to the node 106.

Multicast Group Approach

Another approach to achieve multicasting effect is to form a multicasting group that consists of all the cluster nodes 106. Forming a multicasting group can be done by setting the MAC addresses of the NICs for each node 106 to be multicast MAC addresses. For example, the multicast MAC addresses may always have the first bit of the first byte set to a specified value (e.g., 1).

Under the multicast group approach, when the cluster 108 is configured, the MAC addresses of all the NICs for each node 106 are set to multicast MAC addresses. When the system administrator assigns an IP address to the cluster 108, the IP address is bound to one of the NICs.

When a packet is sent from a client 102 using the cluster IP address, the packet is a multicast packet. When the packet arrives at the switch 104 that connects all of the cluster nodes 106, the packet will be automatically multicast to all the nodes 106 in the multicast group. This way, all the nodes 106 belonging to that multicast group will receive the packets.

Packet Filtering and Distribution Function

Once the cluster nodes 106 receive a client 102 packet that has been multicast, each cluster node's 106 device driver filters that packet based on the packet header and a distribution function. The cluster node 106 may accept the packet when the packet header indicates that the destination MAC and destination IP addresses are the cluster 108 IP and cluster MAC addresses, and the distribution function indicates that the node 106 should accept the packet. The distribution function ensures that only one node 106 accepts the packet at a time.

When a cluster node 106 replies to the client 102, the device driver writes the cluster 108 MAC address in the packet header to pretend that the request was returned from the cluster 108 IP/MAC. The replies can be sent back directly to clients 102 without multicasting. In a switching environment, multiple replies can be forwarded to the clients 102 simultaneously.

The distribution function on each cluster node 106 is used to figure out how to balance the workload. A variety of distribution functions may be utilized to balance the workload. For example, one function may mod the source IP address with the number of cluster nodes 106. However, such a calculation may provide a static result. In another approach, the distribution function may be dynamically adjusted to achieve load balancing. Such an approach dynamically adjusts workload distribution based on the total workload observed by the cluster 108, for example. A variety of methods may be utilized to provide a dynamically adjusting function.

In one instance of a dynamically adjusted approach, the total workload observed by the cluster 108 may be represented by a bitmap with k bits. k may be a relatively large number compared to the number of cluster nodes 106, but not too large that increases the memory requirement. Further, the value of k may depend on the rough estimates of the number of clients 102 that may access the cluster 108 (e.g., 256). Each cluster node 106 maintains such a bitmap. The workload assignment is based on a specified value (e.g., 1s) in the bitmap. In one or more embodiments, 1's in the bitmaps on different cluster nodes 106 do not overlap and an "or" operation of all the bitmaps on the cluster nodes results in a k-bit bitmap with all 1's.

A cluster node 106 accepts a client 102 packet based on an algorithm. The algorithm provides that if a cluster node 1 has a bitmap with bit m being 1, the requests from client i whose source IP address mod k equals to m will be assigned to node 1. Initially, the workload is assumed to be evenly distributed across the nodes 106, so k/n bits are set to 1 (wherein n is the number of cluster nodes).

A daemon may run on each cluster node 106 to collect the node 106 workload statistics periodically. Further, the cluster nodes 106 may periodically exchange workload statistics information so that the nodes 106 can view the global workload distribution. After all nodes 106 exchange information, each node 106 may examine the workload statistics gathered from all of the nodes 106, and carry out computations to redistribute the workload so that the load can be rebalanced. The new workload assignment may be indicated by 1's in the bitmap. Accordingly, the load can be balanced adaptively.

In one or more embodiments of the invention, the workload distribution function does not need to be fixed at the network device driver level. Further, the workload distribution may be based on the accessed file regions. Distributing data based on file system information implies that the distribution is done at the file system level, not at the network device driver level. Accordingly, in one or more embodiments of the invention, the overall workload distribution scheme may involve both networking and file system, thereby complicating the overall workload distribution scheme.

High Availability and Reliability

One or more embodiments of the invention provide high availability and reliability using the multicast-based approach. For example, cluster node i mod n can monitor node (i-1) mod n's liveness (wherein n is the number of nodes 106 in the cluster 108). When node i-1 fails, node i informs all other cluster nodes 106 about node i-1's failure.

Once all of the cluster nodes 106 receive the node 106 failure information, the nodes 106 may simply recompute the workload distribution by assuming that no work should be assigned to node i-1. Such an approach may be performed in a UDP-like stateless protocol.

Accordingly, the scheme of the invention can tolerate multiple node 106 failures with very little overhead. Adding nodes 106 to the cluster 108 is also simple and can be done on-line if the hardware and the underlying parallel file system support the addition. First, the new node 106 needs to be added to the multicast group or VLAN. After all of the existing nodes 106 are informed about the added node 106, the nodes 106 can adjust their distribution function so that next time when the workload is redistributed, the new node 106 will be assigned with some fraction of workload based on the distribution function automatically.

For state-oriented connections (e.g., TCP), existing connections may be difficult to redistribute. In such an embodiment, only new connections may be reassigned to the new nodes 106 based on the new distribution function. Existing connections may either have to be completely moved (with other TCP-stated related information) from one node 106 to another node 106 or the existing connections may have to stay with the old node 106. Accordingly, extra information may be needed to indicate which connections are existing connections that need to utilize the old distribution function if the TCP connections stay on the same node 106. A similar problem may exist when nodes 106 are removed or added. However, a solution similar to that described above may be utilized.

Scaling to a Large Number of Cluster Nodes 106

For a read-dominant workload, one or more embodiments can scale to a large number of nodes 106, since the return traffic from servers 106 to clients 102 can go through different routes simultaneously without performing multicasting. The scalability may become a problem if the workload is write-dominant, since the incoming traffic from clients 102 is multicast to all of the cluster nodes 106. Additionally, one or more embodiments of the invention may provide a hybrid of a domain name system (DNS) and the multicast approach (as described above).

System Flow

Figure 2:
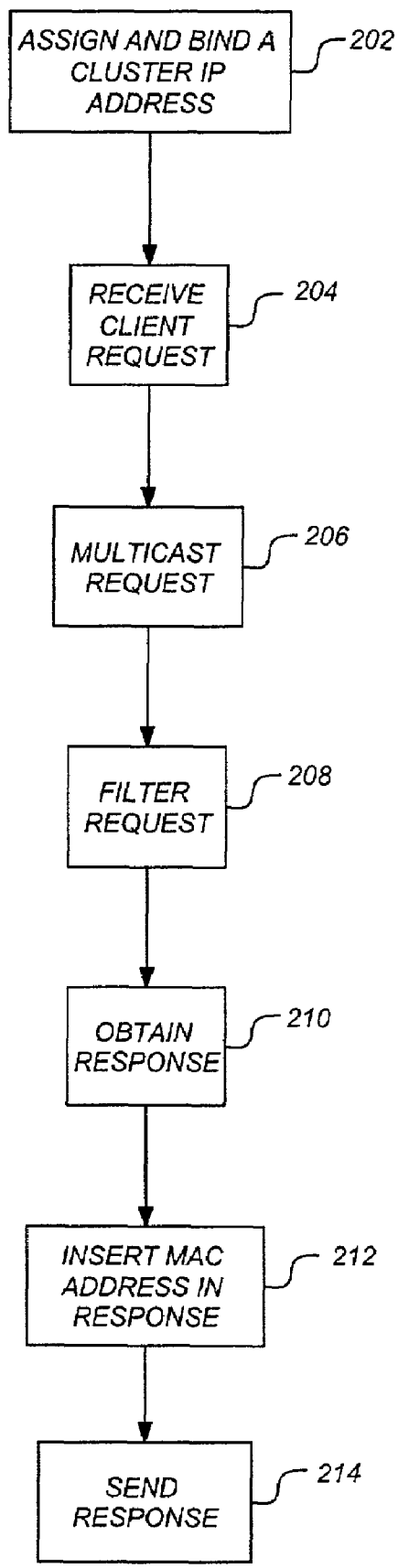
FIG. 2 is a flowchart illustrating the use of a multicast-based scheme in accordance with one or more embodiments of the invention.

FIG. 2 is a flowchart illustrating the use of a multicast-based scheme in accordance with one or more embodiments of the invention. At step 202, an IP address is assigned as a cluster IP address and bound to a node 106 in the cluster 108. At step 204, a client 102 request directed to the cluster IP address is received from a client 102 at the bound node 106. At step 206, the client 102 request is multicast to all nodes 106 in the cluster 108. As described above, a VLAN or multicast group approach may be used to perform the multicasting. At step 208, the client 102 request is filtered based on a dynamically adjustable workload distribution function. As described, the function is configured to distribute workload among nodes 106 in the cluster 108 and allows a single node 106 to process the client 102 request. Further, the distribution may be based on the periodic collection of workload statistics that may be shared amongst the nodes 106 in the cluster 108.

At step 210, a response to the request is obtained. At step 212, a cluster MAC address is inserted into a response by the node 106 responding to the request. At step 212, the response is sent from the single node 106 to the client 102. The response may be sent directly from the node 106 without multicasting. Accordingly, the client 102 is presented with a single system image of the file servers 106 in the cluster 108.

CONCLUSION

This concludes the description of one or more embodiments of the invention. In summary, the invention describes a method, apparatus, article of manufacture, and a memory structure for a multicast-based scheme that provides a single system image in a cluster-based network attached file server system. The multicast based approach provides SSI to users/clients 102. The scheme may eliminate a single point of failure and may avoid a single-node performance bottleneck. Further, one or more embodiments provide a system that is client transparent and may only utilize a special device driver.

Accordingly, a multicast technique allows cluster nodes 106 to receive client 102 requests. A workload distribution function (that may be installed in a special device driver) in each cluster node 106 performs appropriate packet filtering. Further, one or more embodiments provide a dynamic load balancing scheme that is based on periodically gathered workload statistics. In one or more embodiments VLAN technology is combined with a cluster 108 to provide efficient multicasting. In another embodiment, a multicast-group approach is utilized to enable multicasting of client 102 requests to cluster nodes 106.

The foregoing description of one or mote embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing a single system image in a clustered environment comprising:
    (a) assigning an internet protocol (IP) address as a cluster IP address;
    (b) binding the cluster IP address to a node in a cluster;
    (c) receiving a client request directed to the cluster IP address;
    (d) multicasting the request to all nodes in the cluster;

(e) each node in the cluster filtering the request based on a dynamically adjustable workload distribution function on each node, wherein the function is configured to allow a single node to process the client request, and wherein the function distributes the workload by:
  (i) representing a total workload observed by the cluster as a bitmap with a number of bits k;
  (ii) obtaining a bit m by performing a mod operation of a source IP address of the client by the number of bits k; and
  (iii) assigning the client request to a cluster node that has a specified value at bit m;
(f) a single node in the cluster obtaining a response to the request;
(g) the single node inserting a cluster media access control (MAC) address into the response; and
(h) sending the response from the single node to the client.

2. The method of claim 1 further comprising informing other nodes in the cluster of the cluster IP address and a media access control (MAC) address associated with the node that is bound to the cluster IP address.

3. The method of claim 1 further comprising:
  (a) forming a virtual local area network (VLAN) comprising:
    (1) a master node wherein the master node is the node that is bound to the cluster IP address;
    (2) at least one network interface for each node in the cluster; and
  (b) wherein multicasting comprises packet forwarding and processing the client request from the master node to the other nodes in the VLAN.

4. The method of claim 1 further comprising:
forming a multicasting group comprising all of the cluster nodes; and
wherein the multicasting comprises automatically multicasting the request to all of the cluster nodes in the multicasting group.

5. The method of claim 4 wherein the multicasting group is formed by setting the MAC addresses of network interface cards of nodes in the cluster to be a multicast MAC address.

6. The method of claim 5 wherein the MAC addresses are set by setting a first bit of a first byte to a certain value.

7. The method of claim 1 wherein the workload distribution function is installed in a driver on each node in the cluster.

8. The method of claim 1 wherein the workload distribution function filters the client request based on workload distribution and whether a packet header of the client request indicates that destination MAC and IP addresses are the cluster IP and cluster MAC addresses.

9. The method of claim 1 wherein the response is sent from the single node to the client without multicasting.

10. The method of claim 1 wherein the workload distribution function distributes the workload by performing a mod operation of a source IP address with a number of nodes in the cluster.

11. The method of claim 1 wherein the workload distribution function distributes the workload based on workload statistics that are periodically collected by at least one cluster node.

12. The method of claim 11 wherein cluster nodes periodically exchange workload statistics information.

13. The method of claim 1 further comprising:
adjusting a number of nodes in the cluster;
recomputing a workload distribution based on the number of nodes in the cluster; and
redistributing the workload among nodes in the cluster based on the recomputation.

14. An apparatus for providing a single system image in a clustered environment comprising:
(a) a master node in a storage cluster, wherein a node in the storage cluster is designated as the master node by assigning an internet protocol (IP) address as a cluster IP address and binding the cluster IP address to the master node, wherein the master node is configured to:
  (1) receive a client request directed to the cluster IP address;
  (2) multicast the request to all nodes in the cluster;
(b) at least one additional node in the storage cluster; and
(c) a dynamically adjustable workload distribution function installed on each node in the cluster, wherein the function is configured to filter the client request by allowing a single node to process the client request and wherein the function is configured to distribute the workload by:
  (1) representing a total workload observed by the cluster as a bitmap with a number of bits k;
  (2) obtaining a bit m performing a mod operation of a source IP address of the client by the number of bits k; and
  (3) assigning the client request to a cluster node that has a specified value at bit m;
wherein each node in the cluster is configured to:
  obtain a response to the request;
  insert a cluster media access control (MAC) address into the response; and
  send the response from the single node to the client.

15. The apparatus of claim 14 wherein the master node is further configured to inform the other nodes in the cluster of the cluster IP address and a media access control (MAC) address associated with the master node.

16. The apparatus of claim 14 wherein:
the storage cluster comprises a virtual local area network (VLAN); and
the master node is configured to multicast the request by packet forwarding and processing the client request from the master node to the other nodes in the VLAN.

17. The apparatus of claim 14 wherein:
the storage cluster comprises a multicasting group comprising all of the cluster nodes; and
the master node is configured to multicast by automatically multicasting the request to all of the cluster nodes in the multicasting group.

18. The apparatus of claim 17 wherein the multicasting group is formed by setting the MAC addresses of network interface cards of nodes in the cluster to be a multicast MAC address.

19. The apparatus of claim 18 wherein the MAC addresses are set by setting a first bit of a first byte to a certain value.

20. The apparatus of claim 14 wherein the workload distribution function is installed in a driver on each node in the cluster.

21. The apparatus of claim 14 wherein the workload distribution function filters the client request based on workload distribution and whether a packet header of the client request indicates that destination MAC and IP addresses are the cluster IP and cluster MAC addresses.

22. The apparatus of claim 14 wherein the response is sent from the single node to the client without multicasting.

23. The apparatus of claim 14 wherein the workload distribution function distributes the workload by performing a mod operation of a source IP address with a number of nodes in the cluster.

24. The apparatus of claim 14 wherein the workload distribution function distributes the workload based on workload statistics that are periodically collected by at least one cluster node.

25. The apparatus of claim 24 wherein cluster nodes periodically exchange workload statistics information.

26. The apparatus of claim 14 wherein the workload distribution function is further configured to adjust a number of nodes in the cluster by:

recomputing a workload distribution based on the number of nodes in the cluster; and redistributing the workload among nodes in the cluster based on the recomputation.

27. An article of manufacture, embodying logic to perform a method of providing a single system image in a clustered environment, the method comprising:

(a) assigning an internet protocol (IP) address as a cluster IP address;

(b) binding the cluster IP address to a node in a cluster;

(c) receiving a client request directed to the cluster IP address;

(d) multicasting the request to all nodes in the cluster;

(e) each node in the cluster filtering the request based on a dynamically adjustable workload distribution function on each node, wherein the function is configured to allow a single node to process the client request, and wherein the function distributes the workload by:

(i) representing a total workload observed by the cluster as a bitmap with a number of bits k;

(ii) obtaining a bit m by performing a mod operation of a source IP address of the client by the number of bits k; and (iii) assigning the client request to a cluster node that has a specified value at bit m;

(f) a single node in the cluster obtaining a response to the request;

(g) the single node inserting a cluster media access control (MAC) address into the response; and (h) sending the response from the single node to the client.

28. The article of manufacture of claim 27 wherein the method further comprises informing other nodes in the cluster of the cluster IP address and a media access control (MAC) address associated with the node bound to the cluster IP address.

29. The article of manufacture of claim 27, the method further comprising:

(a) forming a virtual local area network (VLAN) comprising:

(1) a master node wherein the master node is the node that is bound to the cluster IP address;

(2) at least one network interface for each node in the cluster; and (b) wherein multicasting comprises packet forwarding and processing the client request from the master node to the other nodes in the VLAN.

30. The article of manufacture of claim 27, the method further comprising:

forming a multicasting group comprising all of the cluster nodes; and wherein the multicasting comprises automatically multicasting the request to all of the cluster nodes in the multicasting group.

31. The article of manufacture of claim 30 wherein the multicasting group is formed by setting the MAC addresses of network interface cards of nodes in the cluster to be a multicast MAC address.

32. The article of manufacture of claim 31 wherein the MAC addresses are set by setting a first bit of a first byte to a certain value.

33. The article of manufacture of claim 27 wherein the workload distribution function is installed in a driver on each node in the cluster.

34. The article of manufacture of claim 27 wherein the workload distribution function filters the client request based on workload distribution and whether a packet header of the client request indicates that destination MAC and IP addresses are the cluster IP and cluster MAC addresses.

35. The article of manufacture of claim 27 wherein the response is sent from the single node to the client without multicasting.

36. The article of manufacture of claim 27 wherein the workload distribution function distributes the workload by performing a mod operation of a source IP address with a number of nodes in the cluster.

37. The article of manufacture of claim 27 wherein the workload distribution function distributes the workload based on workload statistics that are periodically collected by at least one cluster node.

38. The article of manufacture of claim 37 wherein cluster nodes periodically exchange workload statistics information.

39. The article of manufacture of claim 27, the method further comprising:

adjusting a number of nodes in the cluster;

recomputing a workload distribution based on the number of nodes in the cluster; and redistributing the workload among nodes in the cluster based on the recomputation.

* * * * *